Patented Sept. 7, 1948

2,449,041

UNITED STATES PATENT OFFICE 2,449,041

RIBOFLAVIN SOLUTIONS

Sidney D. Upham, Pearl River, N. Y., assignor to American Cyanamid Company, New York, N. Y., a corporation of Maine No Drawing. Application April 12, 1946, Serial No. 661,877

1 Claim. (Cl. 167—81)

This invention relates to new vitamin preparations and an improved method of preparing the same. More particularly the invention relates to glycol solutions containing riboflavin esters which are adapted for use either parenterally or orally and which may have other vitamin and growth factors present therein.

Riboflavin is one of the vitamins of the B complex, sometimes known as $B_2$. The compound itself is, however, water insoluble and accordingly difficulty is encountered in its administration. Various efforts have been made in the past to increase the convenience of its use, but prior to this invention, no satisfactory solution had been found to the problem.

It is frequently desired to administer the vitamin parenterally and to do so it is necessary that the vitamin be present in a therapeutically effective amount in a reasonable quantity of a harmless solvent.

Esters of riboflavin are generally more soluble than the riboflavin itself. The esters with polycarboxylic acids, and particularly the hydroxycarboxylic acids are sufficiently soluble in glycols that therapeutic doses may be administered in comparatively small volumes of solution. The esters of riboflavin may be prepared as described in the copending application of Anthony M. Moos and Sidney D. Upham, S. N. 587,434, filed April 9, 1945; by, for example, dissolving citric acid and the riboflavin in phenol, heating at about 140° C. for several hours, cooling, pouring into ether, and recovering the precipitated mono-riboflavin ester of citric acid. The acidity of the ester may be neutralized by treatment with sodium hydroxide or sodium acetate.

For the purposes of my invention, the citrate mono-ester is particularly desirable, although the higher esters of citric acid, or an ester of tartaric acid, malic acid, succinic acid or phthalic acid or other polycarboxy acid may conveniently be used. The higher solubility of the hydroxy polycarboxylic acid esters render them particularly suitable.

In accordance with the preferred embodiment of the present invention, propylene glycol is particularly useful as the solvent. Dipropylene glycol or other known non-toxic glycol or mixtures thereof may be used. Ethylene glycol is a good solvent, but is not suitable for the purposes of my invention in those instances where its toxicity is detrimental to the subject. The importunate use of ethylene glycol as a solvent for therapeutic administration of drugs in times past has been responsible for the death of several individuals. Propylene glycol is harmless to both humans and animals in any reasonable dosages. The high solvency of the glycols, in accordance with my invention, permits high concentrations of therapeutic materials in small volumes. Polypropylene glycols and higher glycols are useful for the purposes of my invention where the non-toxicity permits, and where the viscosity is satisfactory for parenteral use.

The disodium citric acid ester of riboflavin is soluble to the extent of over 40 mg. per cc. Normally for parenteral administration, concentrations of the ester giving the physiological effect of about 10 mg. of riboflavin per cc. are most desirable when the riboflavin is to be administered alone, and concentrations in the vicinity of 5 mg. per cc. when the riboflavin is to be administered in conjunction with other vitamins. Concentrations of from 2 to 25 mg. per cc. may be preferred by some users. These concentrations are in no way fixed by the solubility of the riboflavin esters but, mainly, are fixed so as to give a desired dose in a convenient volume. The normal daily requirement of riboflavin is about 2 mg. for an adult, although massive therapeutic dosages may call for the administration of larger amounts. The concentration of the riboflavin as given above is most convenient so that a readily measurable quantity is used but not an objectionably large quantity.

When desired for therapeutic purposes other vitamins may be present in the glycol solution. Among the vitamins and growth factors which are sufficiently soluble in the glycol to be effective and which may be desirable in the treatment of particular avitaminoses are:

Vitamin A
Vitamin D
Thiamine
Niacine amide
Pantothenic acid, calcium salts or otherwise
Pyridoxine
Ascorbic acid
Folic acid or folic acid complexes My solutions may be used for oral administration where desired. The solutions containing Vitamins A and D are particularly suitable for oral administration.

The solutions of my invention are particularly useful because of their great stability. The stability of the vitamin potency itself is remarkably high and the vitamins do not precipitate out from the solution on standing, even at low temperatures. Propandiol solutions prepared in accordance with my invention will stay clear and without precipitate many months even at 4° C., or under tropical temperatures. Further, the solutions of riboflavin citrate in propylene glycol can be sterilized in an autoclave without a reduction in potency.

When the solutions are prepared comparatively anhydrously no reaction occurs which causes precipitation of insoluble salts such as an interaction of vitamins which takes place between pantothenic acid and ascorbic acid in aqueous solutions, resulting in the precipitation of insoluble salts.

The concentrated solutions of vitamins as prepared in accordance with my invention are very useful for the administration of vitamins for small children, as a few drops of the vitamin concentrate in water, milk, or other food may be fed to a small child with far less difficulty than is usually experienced in the administration of the vitamin needs.

Where concentrations are referred to in terms of milligrams of riboflavin per cc. for administration as a vitamin, the reference is intended to refer to the amount of ester necessary to give a therapeutic effect of that quantity of riboflavin. The riboflavin citrate is available in the body to such an extent that nearly all of the theoretically present riboflavin is therapeutically available, but because of the presence of the citric acid, more than 10 mg. of the ester are necessary to supply 10 mg. of riboflavin as such per cc. in solution. Other riboflavin esters have available a large proportion of the riboflavin, but the monoriboflavin citrate is particularly useful because practically all of the riboflavin present is physiologically available upon its administration, orally or parenterally.

The following examples are illustrations of my invention which show specific preparations for particular purposes which may be prepared in accordance with the present invention. All proportions are given as weight per unit of volume unless otherwise indicated. The particular ratios of the various vitamins which are illustrated below are chosen because they are the ratios in which vitamins are frequently required by various living organisms, but may be varied widely from the proportions given when the vitamin requirements of any living organism so indicate.

Example 1

15.2 grams of citric acid and 29.6 grams of riboflavin were heated in 200 cc. of phenol at 140° C. for 4 hours, cooled to 45° C., and poured with stirring into 1500 cc. of ether. The precipitated ribocitrate was filtered, triturated with a liter of ether, and refiltered. A disodium salt was prepared by mixing 4 grams of the above ester and 1.2 grams of anhydrous sodium acetate in 400 cc. of warm ethanol, concentrating under reduced pressure to 50 cc., and recovering the crystallized disodium monoriboflavin citrate.

A quantity of this citrate sufficient to contain 10 grams of riboflavin was dissolved by shaking in sufficient propylene glycol to given one liter of solution. The solution was then sealed in ampules and sterilized in an autoclave. No appreciable decrease in potency occurred during the sterilization procedure.

Example 2

40 grams of the riboflavin citrate was dissolved in sufficient propylene glycol to make one liter of solution. The concentrated solution remained stable on standing and did not precipitate over a period of several months, nor at a temperature of 4° C. The solution may be diluted for convenience in administration.

Example 3

A solution was prepared by dissolving

|  | Grams |
|---|---|
| Riboflavin citrate | 11 |
| Thiamine | 10 |
| Niacine | 50 |
| Calcium pantothenate | 20 |
| Pyroxidine | 5 |
| Ascorbic acid | 100 |
| Methyl hydroxy benzoate | 0.8 |
| Propyl hydroxy benzoate | 0.2 | in sufficient propylene glycol to make one liter of solution. A dosage of one cc. of the solution per day supplies sufficient quantities of the included vitamins for normal human requirements.

Example 4

A solution was prepared by shaking the following materials together:

| | | |
|---|---|---|
| Riboflavin citrate | grams | 19 |
| Methyl hydroxy benzoate | do | 0.8 |
| Propyl hydroxy benzoate | do | 0.2 |
| Propylene glycol q. s. | liters | 1 |

The solution as thus prepared was stable on long standing, the benzoate present serving as a preservative. The material was used for both oral and parenteral administration and supplied the requirements of riboflavin.

Example 5

A stable solution was prepared by dissolving suitable quantities of vitamins in dipropylene glycol to give a solution which gave an assay per cc. of Ascorbic acid—50 mg.
Thiamine—5 mg.
Riboflavin—5 mg.
Vitamin A—5000 U. S. P. XII units
Vitamin D—500 U. S. P. XII units.

Dipropylene glycol was used as the solvent, the riboflavin was present as the citrate mono-ester, and the thiamine as the hydrochloride. The proportions chosen are in no way critical, as solutions may readily be prepared with a wide variation from these proportions, but this proportion was chosen as one which gives therapeutically desirable ratios. The ratio may be varied to meet the requirements of different subjects.

The above concentrations of material are not intended as being limiting as higher concentrations may be readily attained, however, for convenience in use in most instances approximately these concentrations will be found particularly desirable. In specialized instances or wherever it is found desirable to adjust the ratio for a particular subject, the various quantities may be readily adjusted. Complexes of other materials may be added when therapeutically indicated. Examples of such material are iron lactate, the amine salt of folic acid, etc.

I claim:

A storage-stable, sterile therapeutic vitamin preparation, suitable for either oral or parenteral use comprising propylene glycol as a solvent, and dissolved therein, to form a clear solution, sufficient riboflavin citrate to be the physiological equivalent of not less than 2 milligrams of riboflavin per cubic centimeter of solution.

SIDNEY D. UPHAM.

REFERENCES CITED

The following references are of record in the file of this patent:

UNITED STATES PATENTS

| Number | Name | Date |
|---|---|---|
| 2,358,356 | Stein | Sept. 19, 1944 |
| 2,398,706 | Haas | Apr. 16, 1946 |

FOREIGN PATENTS

| Number | Country | Date |
|---|---|---|
| 486,054 | Great Britain | May 30, 1938 |

OTHER REFERENCES

U. S. Dispensatory, 23d Ed. (1943) page 1536.
Gutman—Modern Drug Encyclopedia, 3d Ed. (1946) page 82.